H. H. JORDAN.
TOOL BOX.
APPLICATION FILED MAY 26, 1919.
1,383,259.
Patented June 28, 1921.
2 SHEETS—SHEET 1.
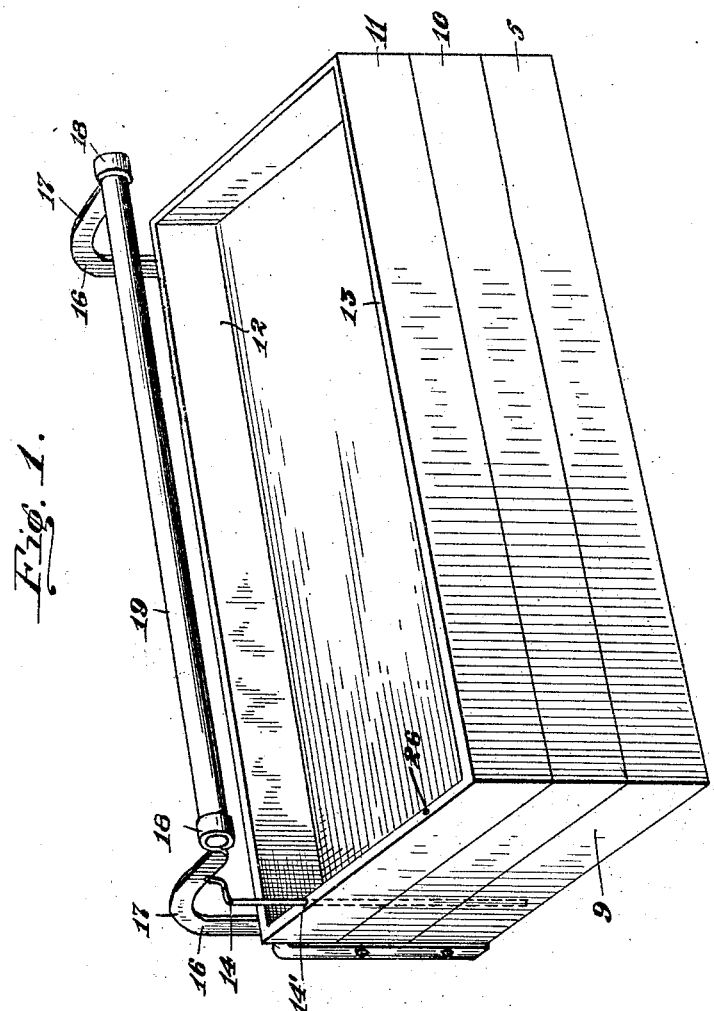
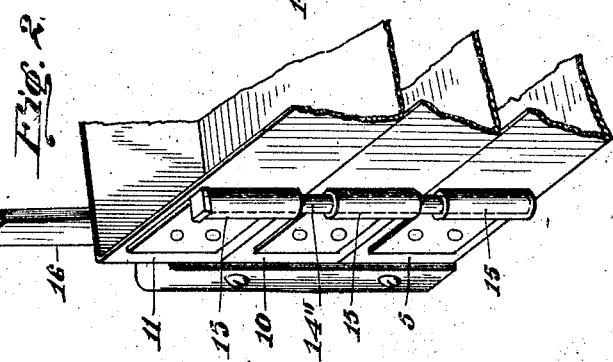
INVENTOR
Herman H. Jordan
BY
ATTORNEY H. H. JORDAN.
TOOL BOX.
APPLICATION FILED MAY 26, 1919.
1,383,259.
Patented June 28, 1921.
2 SHEETS—SHEET 2.
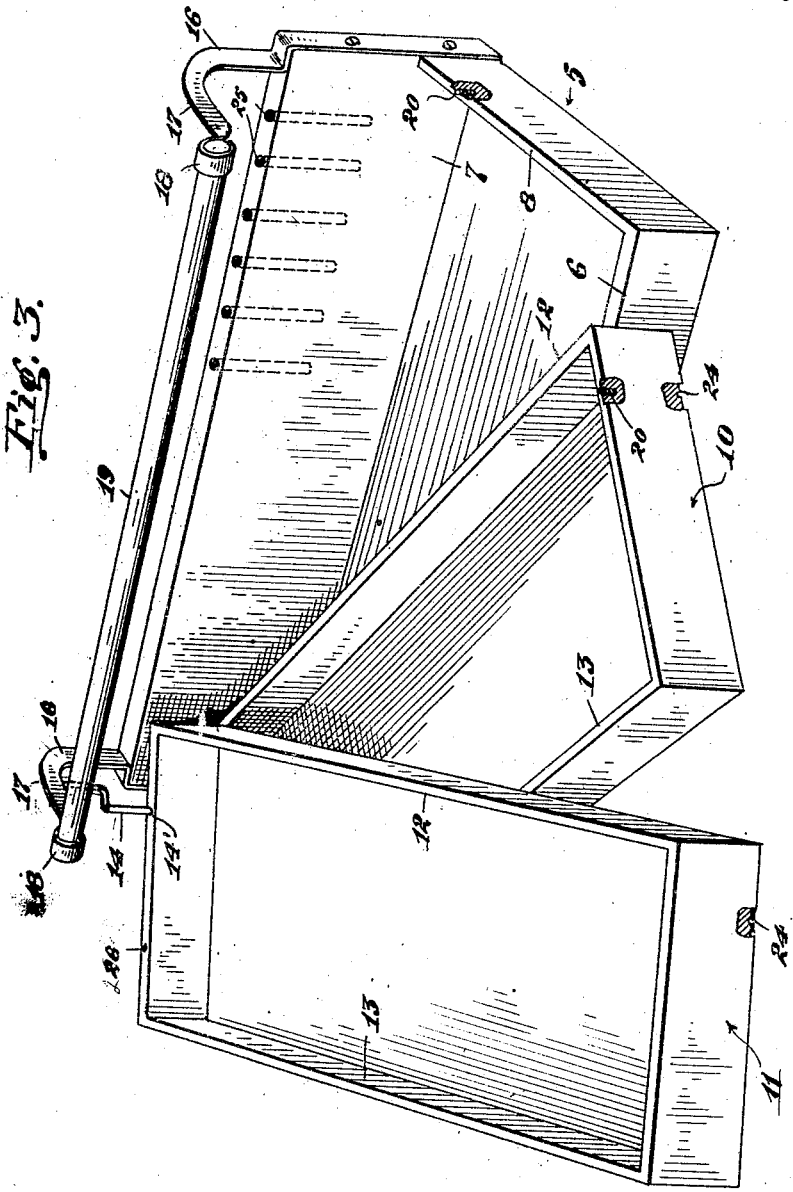
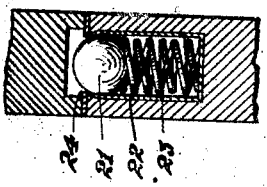
INVENTOR
Herman H. Jordan:
BY
R. S. Berry
ATTORNEY

UNITED STATES PATENT OFFICE.

HERMAN H. JORDAN, OF LOS ANGELES, CALIFORNIA.

TOOL-BOX.

1,383,259.  Specification of Letters Patent.   Patented June 28, 1921.

Application filed May 26, 1919. Serial No. 299,745.

*To all whom it may concern:*

Be it known that I, HERMAN H. JORDAN, a citizen of the United States, residing at Los Angeles, in the county of Los Angeles and State of California, have invented new and useful Improvements in Tool-Boxes, of which the following is a specification.

This invention particularly pertains to a tool box, but relates in general to portable containers, cases, cabinets, and the like, for the reception of tools and other articles according to the various uses to which it may be put.

It is the object of this invention to provide a box embodying a plurality of separable superimposed trays pivotally mounted to swing independent of each other and so arranged as to obviate the use of an inclosing casing and yet provide a substantial structure.

Another object is to provide a device of the above character by which the trays are rendered separable and interchangeable.

Other objects will appear hereinafter.

The invention is illustrated in the accompanying drawings in which:

Figure 1 is a perspective view showing the box with trays in their closed position.

Fig. 2 is a detail in perspective showing a modified form of the pivotal mounting of the superimposed trays.

Fig. 3 is a perspective view showing the box with the trays in a partly open position.

Fig. 4 is an enlarged detail in section and elevation showing a catch for interlocking adjacent trays.

In carrying out my invention I provide a bottom tray 5 having front and rear walls 6 and 7 and end walls 8 and 9, the back wall of which is of such height as to extend above the end walls such distance as to form an abutment for superimposed trays 10 and 11.

The front and end walls of the bottom tray 5 have their upper edges flush to form a seat for the tray 10. The trays 5, 10 and 11 are rectangular in form and of substantially corresponding sizes, the trays 10 and 11, however being of slightly less width so that when the trays are positioned against the upwardly extending rear wall 7 the front walls 13 will be flush with the front wall 6. The trays 5, 10 and 11 are pivotally and detachably connected together adjacent to the rear corners thereof, the trays being here shown as having a pivot pin 14 engaging the end walls of the several trays at one end thereof adjacent to, but spaced from the rear corners. In the form of the pivot mounting shown in Figs. 1 and 3 the pivot pin is passed through vertical openings 14' formed in the end walls of the tray, which walls are preferably wood and of sufficient thickness to accommodate the pivot pin; the pivot pin being passed downwardly through the end wall of the uppermost trays and extended into the end wall 9 of the bottom tray. In the modified form of the pivot mounting shown in Fig. 2, the pivot pin 14" engages sleeves 15, mounted on the end walls of the trays.

Mounted on the upwardly extending rear wall 7 is a pair of spaced standards 16 the upper ends of which are bent forwardly to form brackets 17, having loops 18 on their outer ends engaging a handle bar 19 which extends above the top tray longitudinally and centrally thereof. The handle bar is arranged in such relation to the center of gravity of the trays when in their closed position that when they are supported by the handle they will be normally suspended in substantially a horizontal position. The handle being disposed to extend forwardly from the rear wall of the bottom tray permits the upper trays being swung outwardly clear thereof as shown in Fig. 3. To afford a substantial mounting for the pivot 14 the upper end of the latter may be sprung into a depression formed on the under side of the bracket 17.

If desired the adjacent trays may be detachably connected together by a spring detent 20 here shown as consisting of a ball 21, carried in a socket 22 and acted on by a spring 23 to engage a keeper socket 24; the ball and its socket being carried on the upper edge of a tray and the keeper socket 24 disposed on the under side of the adjacent tray in such position as to register with the ball when the trays are in their closed position.

The interiors of the trays may be partitioned off into various compartments according to the character of the articles that are to be contained therein which construction is arbitrary and need not be here shown. The wall 7 is formed with tool receiving recesses 25 on its upper edge in which tools may be placed for convenience when working with same.

If desired a separate cover panel (not shown) may be provided to close the top panel but this top panel may be inverted and employed as a cover and for this purpose its end wall is formed with an opening 26 positioned to be engaged by the pivot pin when the tray is turned bottom side up.

In the operation of the invention when it is desired to gain access to the interior of the trays the uppermost trays may be swung outwardly on their pivots either separately or collectively to expose the tray therebeneath. The point of pivotal mounting of the trays being spaced from the rear corners thereof disposes the open trays in such offset relation to the trays therebeneath as to support the open trays on both a front and end wall of the lower tray when extending at right angles thereto.

I claim:

A tool box comprising a bottom tray, a back wall on said bottom tray extending outwardly therefrom, a series of superimposed trays, a pivot pin connecting said superimposed trays and the bottom tray adjacent to a corner thereof near said back wall; said back wall forming an abutment against which the superimposed trays may be closed, a pair of brackets on said back wall extending forwardly over the uppermost tray, and a bar carried by said brackets extending substantially on the plane of the longitudinal center of said trays.

HERMAN H. JORDAN.